May 15, 1951 G. F. WALTERS 2,553,024
SYSTEM AND APPARATUS FOR DISTRIBUTING AND
DELIVERING GRANULAR MATERIALS
Filed Aug. 8, 1949 4 Sheets-Sheet 1

INVENTOR.
George F. Walters
BY
Otto A. Earl
Attorney.

May 15, 1951 G. F. WALTERS 2,553,024
SYSTEM AND APPARATUS FOR DISTRIBUTING AND
DELIVERING GRANULAR MATERIALS
Filed Aug. 8, 1949 4 Sheets-Sheet 3
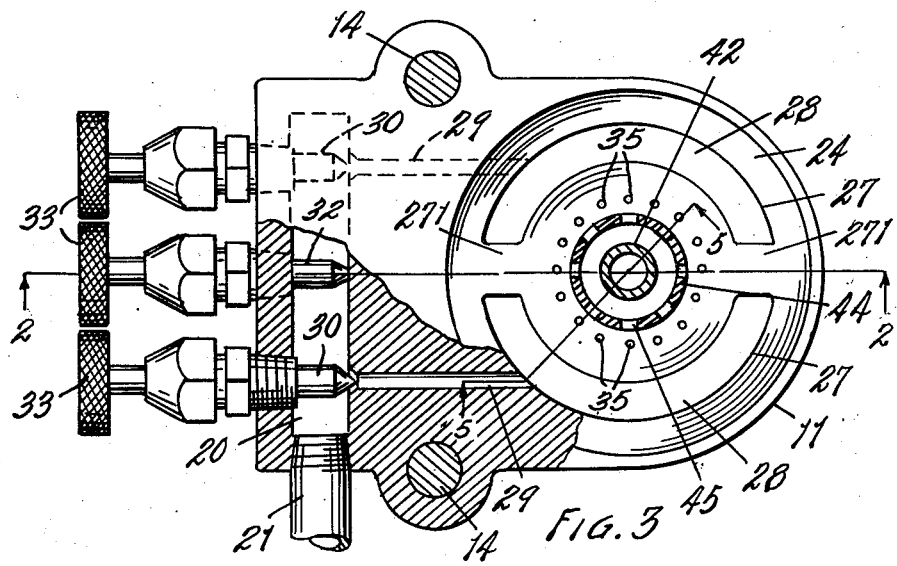
FIG. 3
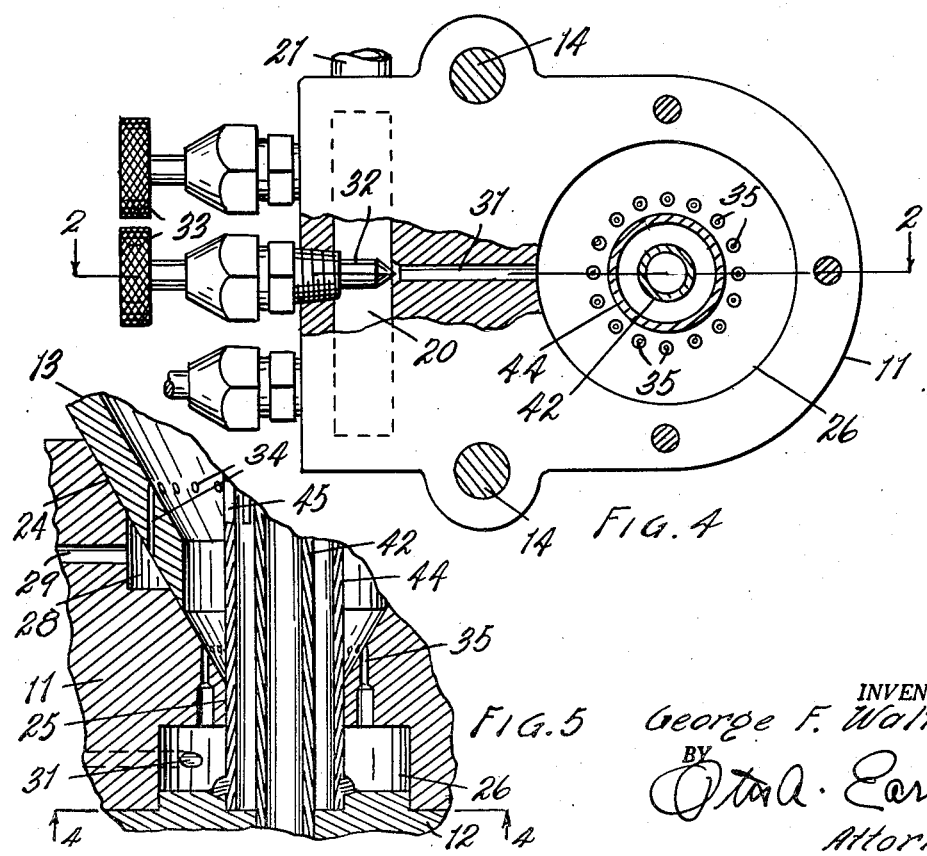
FIG. 4
FIG. 5
INVENTOR.
George F. Walters
BY
Otto A. Earl
Attorney.

May 15, 1951     G. F. WALTERS     2,553,024
SYSTEM AND APPARATUS FOR DISTRIBUTING AND
DELIVERING GRANULAR MATERIALS
Filed Aug. 8, 1949         4 Sheets—Sheet 4

INVENTOR.
George F. Walters
BY
Otto A. Earl
Attorney.

Patented May 15, 1951

2,553,024

UNITED STATES PATENT OFFICE 2,553,024

SYSTEM AND APPARATUS FOR DISTRIBUTING AND DELIVERING GRANULAR MATERIALS

George F. Walters, Gary, Ind.

Application August 8, 1949, Serial No. 109,194

18 Claims. (Cl. 302—53)

1

This application relates to improvements in system and apparatus for distributing and delivering granular materials.

The principal objects of this invention are:

First, to provide a system and apparatus for distributing and depositing a powdered or granular material at pre-determinable rates in any of a plurality of positions located at varying distances from a distribution point.

Second, to provide means for injecting soot destroying chemicals in pre-determinable quantities into various sections of a furnace from a remotely located distribution point.

Third, to provide means for maintaining a continuous supply of a granular or powdered material in a dry condition and in an air suspended position in a distributor where the material may be drawn off at a pre-determined rate by vacuum for introduction into a furnace or other enclosure.

Fourth, to provide distributing apparatus which will continuously transfer a supply of granular material from a bulk container to a distribution area in which the granular material is maintained in a finely divided suspended state in a column of air for withdrawal by vacuum means.

Fifth, to provide a distributor for granular material with means for continuously passing a stream of air through the material to dry the same.

Sixth, to provide a distributor for granular material with means for intermittently injecting a blast of air through the material to break away any cakes or packed quantities of the material which may collect in the distributor.

Seventh, to provide a distributor for granular material in which the rate of delivery of the granular material may be adjusted by varying the amount of material admitted to an air ejector and also by varying the pressure of the air delivered to the ejector.

Eighth, to provide a distributing apparatus capable of delivering granular material through a plurality of delivery ducts of different length and shapes so that a single distributor is effective to supply granular material to a plurality of different positions such as a series of furnaces and different positions in the furnaces.

Ninth, to provide a central distributor capable of supplying granular material at different rates to a plurality of different distribution points.

Other objects and advantages relating to details of my invention will be apparent from a consideration of the following description and claims:

The drawings of which there are 4 sheets illustrate a preferred form of my distributing system and apparatus.

Fig. 3 is a fragmentary plan view, partially broken away in cross section, of the air manifold body shown in Figs. 1 and 2, taken along the plane of the line 3—3 in Fig. 2 with the funnel removed.

Fig. 4 is a bottom plan view partially broken away in cross section, of the air manifold body with the base plate removed.

Fig. 5 is a fragmentary vertical cross sectional view through the air manifold body and the bottom of the distributor funnel taken along the plane of the line 5—5 in Fig. 3.

My distributing apparatus and system is designed primarily for distributing soot destroying chemicals and injecting them in pre-determinable quantities and rates to various positions in one or more boiler furnaces. My apparatus is particularly effective with that type of soot destroying chemical now available commercially under the trade-name of "Oxi" crystals. However, it will be obvious that my apparatus and system may be employed to advantage in any instance where it is desired to distribute a fine granular or powdered material to various points from a central distribution point.

Figure 1:
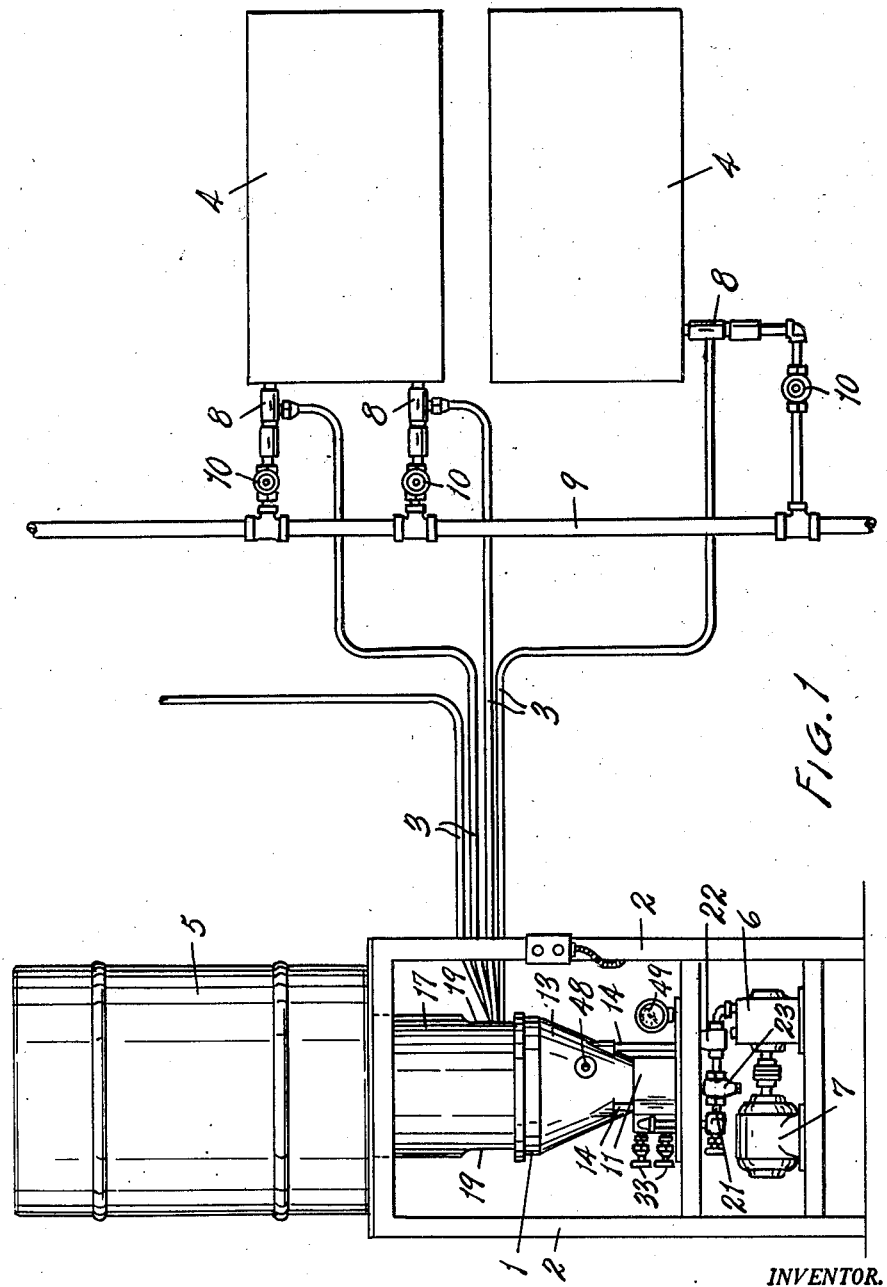
Fig. 1 is an elevational view of the central distributing apparatus operatively associated through various conduits which form part of the distribution system with two boiler furnaces, the furnaces being indicated conventionally as rectangular enclosures.
Figure 2:
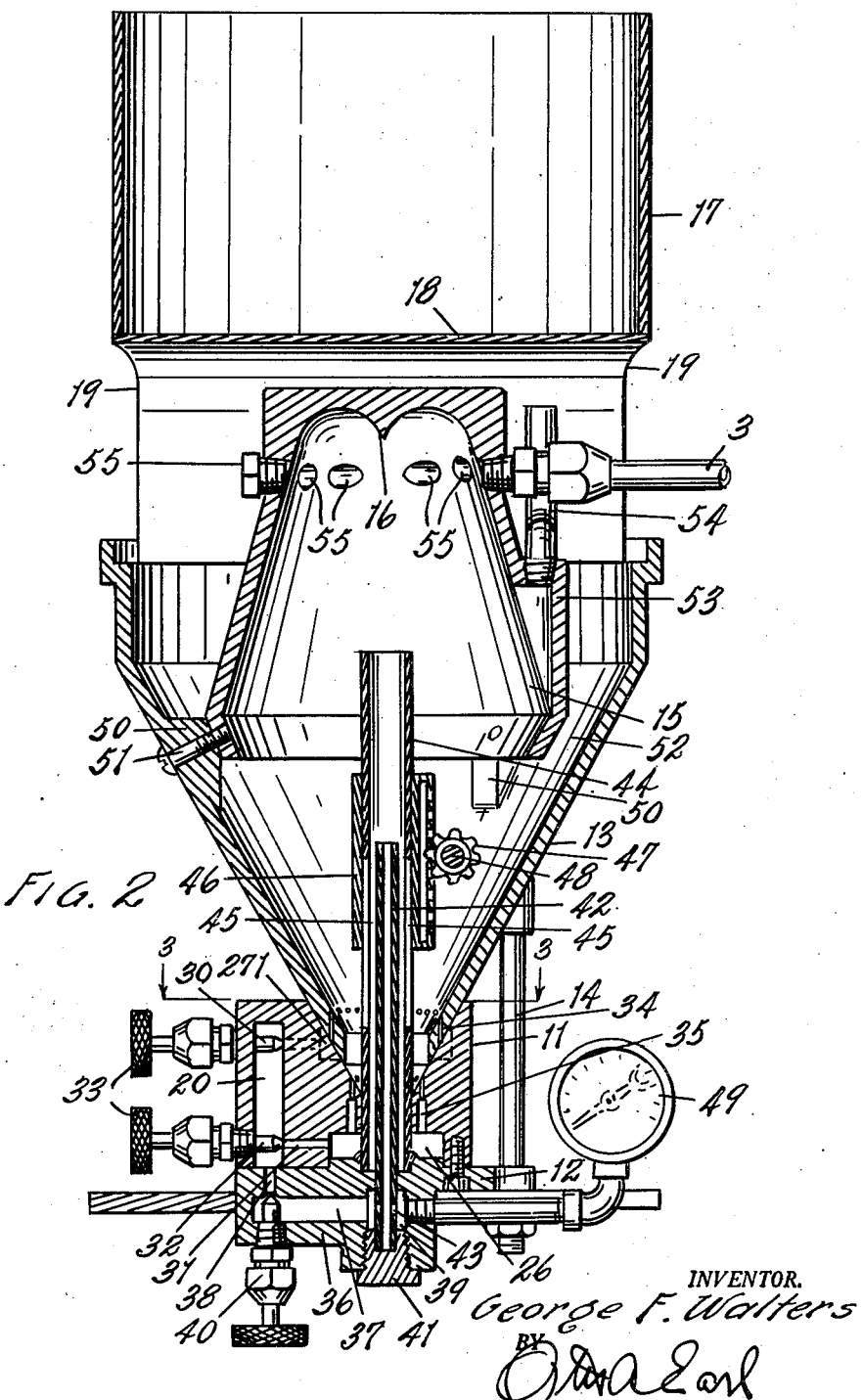
Fig. 2 is a vertical cross sectional view through the distributing apparatus shown in Fig. 1 and taken along the plane of the line 2—2 in Figs. 3 to 6.
Figure 6:
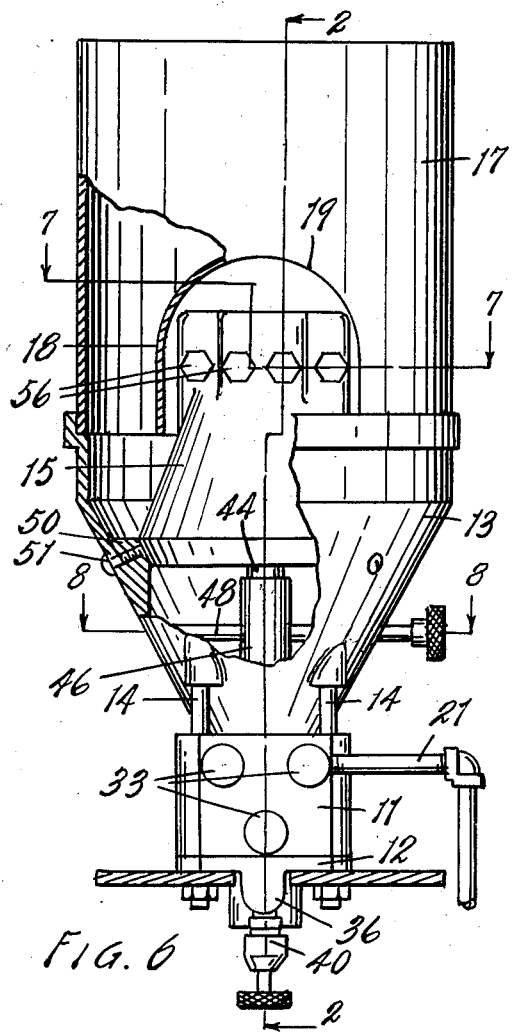
Fig. 6 is a fragmentary front elevational view of the distributor as viewed at 90° from the views illustrated in Figs. 1 and 2 and partially broken away in vertical cross section.
Figure 8:
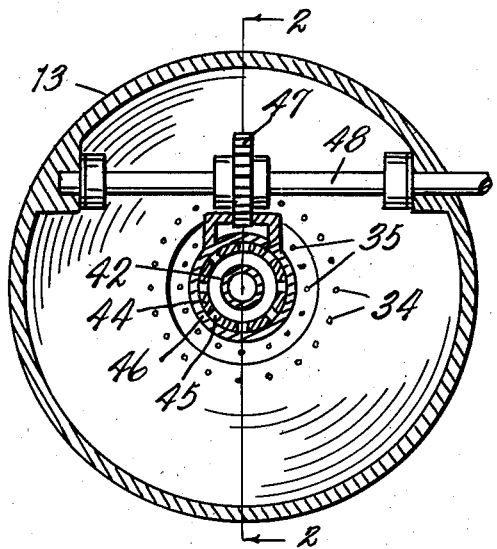
Fig. 8 is a horizontal cross sectional view through the funnel of the distributor and taken along the plane of the line 8—8 in Fig. 6.
Figure 7:
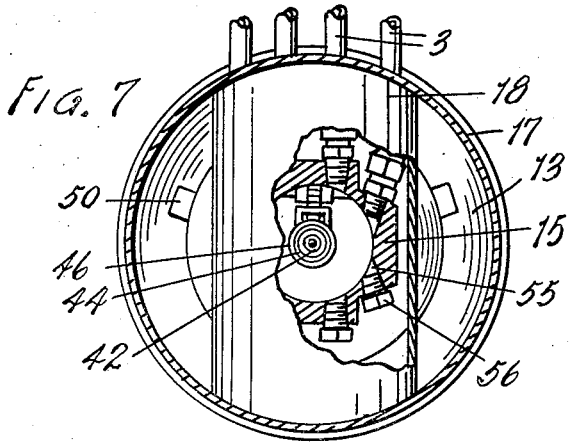
Fig. 7 is a fragmentary horizontal cross sectional view through the hopper and dome of the distributor taken along the plane of the line 7—7 in Fig. 6.

In Fig. 1, I have illustrated my distribution system as consisting generally of a distributor 1 mounted on a framelike support 2 and arranged to deliver granular material through any or all of a plurality of distribution tubes 3 to pre-selected positions in the combustion area of a plurality of boiler furnaces 4. The framelike support 2 is adapted to hold a bulk container of the crystals or chemicals to be distributed as at 5 and an air compressor 6 and driving motor 7 for the distributor are mounted on the support underneath the distributor. Obviously the bulk container 5 may take the form of a large permanent hopper and the individual air compressor 6 may be dispensed with if there is a suitable source of compressed air available in the plant as will be described presently.

The distributor 1 operates to maintain a quantity or a cloud of the chemical to be distributed in a suspended state adjacent to the inner ends of the conduits 3. The conduits 3 extend to the low pressure or vacuum space within individual injectors 8 mounted to discharge into the furnace enclosures 4. Injecting energy for the injectors 8 is derived from compressed air or steam supplied through the fluid pressure pipe 9 and admitted to the injectors 8 through control valves 10. Passage of the pressure fluid through the injectors 8 creates a vacuum in the distribution conduits 3 and serves to draw the chemical to the injector from where it is carried into the combustion area by the force of the pressure fluid.

Considering the details, the construction of the distributor 1, attention is invited to Figs. 2 to 8 which illustrate it to comprise an air manifold body member 11 connected on its underside to a base plate 12. The upper end of the body 11 supports a chemical feeding funnel member 13 and the funnel member is clamped to the body by means of the bolts 14 extending to the base plate 12. Supported within the upper end of the funnel 13 is an inverted conical delivery dome 15 having a depending or inverted conical point 16 formed in its upper closed end. Also supported on the top of the funnel 13 is a tubular chute 17 the upper end of which registers with the discharge opening of the bulk container 5. The dome 15 projects above the funnel into the chute 17 and is shielded from the material passing through the chute by the inverted U-shaped baffle 18 opening through the side walls of the chute as at 19.

The manifold body member 11 is preferably formed as a brass or other non-corrosive casting and forms a generally rectangular plenum chamber 20 along its forward side. Compressed air is delivered to the plenum chamber from the compressor 6 or other suitable source through the pipe 21. Preferably the pipe 21 has a suitable moisture separator 22 and filter 23 interposed therein. (See Fig. 1.) Any source of dry compressed air under the required pressure will be suitable to feed the manifold 20.

The upper face of the manifold body 1 forms a conical recess 24, the walls of which are machined to snugly fit the lower end of the funnel 13 in an air tight joint. The lower end of the conical recess merges into a short vertical bore 25 which in turn opens into a cylindrical chamber 26 formed in the bottom face of the manifold body.

The conical wall 24 is partially cut away near its upper end in a pair of semi-circular grooves 27 having their ends separated by the two ribs 271. When the funnel member 13 is in place on the manifold body the grooves 27 form a pair of semi-circular chambers 28 each of which communicates with the plenum chamber 20 through a valve passage 29. A pair of valve elements 30 extend through the front wall of the plenum chamber for controlling the openings of the valve passages 29. A third valve passage 31 positioned centrally of the manifold body opens between the plenum chamber 20 and the cylindrical recess 26 in the bottom of the manifold body and is controlled by a third valve element 32. All of the valve elements 30 and 32 are provided with suitable adjusting nuts or wheels 33 operable from the front of the manifold body.

Air passing through the valve passages 29 into the semi-circular annular chambers 27 is directed upwardly through a series of centrally arranged vertical ports 34 formed in the lower end of the funnel 13. The purpose of these ports and the jets of air which issue therethrough is to break away any accumulated cake or mass of the crystals being distributed should such a formation accumulate as during periods of inactivity of the distributor. The division of the annular chamber 27 and ports 34 into two sections assures that any accumulation in the funnel can be completely broken away as the full pressure of the air can be applied to either of the annular chambers by operation of the two valves 30.

Air entering the cylindrical recess 26 through the valve passage 31 is directed upwardly through the circularly arranged vertical ports 35 opening through the bottom of the conical recess in the top of the manifold block. It will be noted that the lower end of the funnel 13 terminates above the upper ends of the ports 35 so that air issuing through the ports is directed upwardly through the small bottom end of the funnel. This source of air is provided in order to maintain a constant stream of air through the material being distributed in order to dry the material. This is particularly desirable since the "Oxi" crystals with which the distributor is designed to operate are hygroscopic and tend to absorb moisture from the atmosphere to which they are exposed.

The base plate 12 secured to the bottom of the manifold body 11 closes the bottom of the manifold 20 and the cylindrical recess 26. The plate 12 is provided with a central thickened portion 36 within which is formed an air passage 37 extending between a valve port 38 and a vertical bore 39 formed in the base plate underneath the center of the recess 26. A valve element 40 controls the admission of air through the port 28 to the passage 37 and a screw plug 41 closes the lower end of the bore 39. The plug 41 carries an ejector tube 42 which projects upwardly through the top of the base plate and through the bore 25 in the manifold body to within the funnel member 13. The tube 42 is provided with holes 43 at its bottom through which air from the passage 37 enters the tube. Positioned concentrically around the tube 42 and in spaced relation therewith is a second tube or sleeve 44 which has its lower end secured as by welding to the top of the base plate 12. The sleeve 44 extends upwardly through the bore 25 in the manifold body 11 and into the funnel 13. The sleeve 44 has a tight sealing fit in the bore 25 and prevents the escape of air from chamber 26 except through the ports 35. It will be noted that the sleeve 44 extends substantially above the upper end of the tue 42 and well into the dome 15. A substantial portion of the length of the sleeve 44 is cut away in vertical slots 45 within the funnel thus permitting the crystals or other chemical within the funnel to enter into the sleeve 44.

In operation of the distributor, crystals entering into the sleeve 44 are sucked upwardly by the vacuum created in the sleeve 44 by the air issuing from the ejector tube 42. These crystals will be thrown upwardly against the upper closed end of the dome where they are maintained in partially suspended condition in the column of air issuing from the tube 44. In order to control the amount of crystals ejected from the sleeve 44 there is provided a sleeve valve or gate 46 which can be raised or lowered by operation of the pinion 47 and shaft 48 to uncover more or less of the length of the slots 45. The amount of material ejected can further be controlled by varying the air pressure within the passage 37 and tube 42 by operation of the valve 40. A gage 49 registers the pressure in the passage 37 and may be calibrated in terms of the quantity of material ejected through the tube 44.

The dome 15 into which the crystals are ejected is supported within the funnel 13 by engagement of its lower end with the bosses 50 spaced angularly around the inside of the funnel. Screws 51 hold the dome in position to form annular passages 52 between the bottom of the dome and the side walls of the funnel. Thus material to be distributed is free to follow through the chute 17 and funnel 13 to replace material ejected upwardly through the sleeve 44. The dome 15 is provided on its rear side with a boss or shoulder 53 through which the vent pipe 54 opens. The purpose of the vent pipe 54 is to prevent the building up of any substantial air pressure within the dome as the result of the tube 42 discharging thereinto. Thus the material being distributed continually hangs in a cloud within the dome and around the ports 55 through which the distributor tubes 3 communicate with the dome.

The amount of material distributed by any one of the tubes 3 will be dependent upon the degree of the vacuum formed in the tube by its associated injector 8. Thus one tube may be caused to feed or distribute the material at a different rate than other tubes by varying the amount or pressure of the fluid passing through its injector 8. Variation in the vacuum created by the injector is immediately reflected in variation of vacuum at the port 55 and since a continual cloud of the chemical is maintained in the dome independently of the vacuum in the distributor pipe one tube may draw off more of the cloud of material than the other tubes. The length and number of bends in the distributor tube will of course have some effect on the resistance to passage of material through the tube but this can readily be adjusted or compensated for by varying the fluid pressure applied to the injector associated with the tube.

Not all of the ports 55 may be necessary in some installations and these can readily be closed by means of plugs 56 as is illustrated on the front side of the distributor in the drawings.

Having thus described my invention, what I claim as new and desire to secure by Letters Patent is:

1. A system for introducing a finely divided soot destroying chemical into various positions in a plurality of furnaces comprising, a central distributing apparatus having a funnel as a feed member for gravitationally directing the material from a bulk supply to the bottom of the funnel, means for directing a plurality of drying air jets upwardly from the bottom of said funnel and through said material, an air ejector tube projecting upwardly through the bottom of said funnel, controllable means for supplying compressed air to said ejector tube, a feed sleeve positioned in spaced relationship about said ejector tube and having a plurality of slit-like openings formed in its walls and adjacent to the bottom of said funnel, a sliding gate for varying the effective size of said openings, said feed sleeve projecting substantially above said ejector tube, a dome distributor positioned in said funnel and over said feed sleeve whereby material to be distributed is ejected from said feed sleeve against the top of said distributor, means forming a vent from the interior of said dome to the exterior thereof, said distributor having a plurality of ports opening through its side walls adjacent to its upper end, a plurality of distributor tubes extending from said ports to selected positions adjacent to said furnaces, a fluid pressure injector associated with each of said distributor tubes to create a vacuum therein and to discharge into said furnaces, a source of fluid under pressure for said injectors, and valves for selectively controlling the admission of said fluid to said injectors.

2. A system for introducing a finely divided chemical into various positions in a furnace comprising, a central distributing apparatus having a funnel as a feed member for gravitationally directing the material from a bulk supply to the bottom of the funnel, an air ejector tube projecting upwardly through the bottom of said funnel, controllable means for supplying compressed air to said ejector tube, a feed sleeve positioned in spaced relationship about said ejector tube and having a plurality of openings formed in its walls and adjacent to the bottom of said funnel, said feed sleeve projecting substantially above said ejector tube, a domed distributor positioned in said funnel and over said feed sleeve whereby material to be distributed is ejected from said feed sleeve against the top of said distributor, said distributor having a plurality of ports opening through its side walls adjacent to its upper end, a plurality of distributor tubes extending from said ports to selected positions adjacent to said furnace, a fluid pressure injector associated with each of said distributor tubes to create a vacuum therein and to discharge into said furnace, a source of fluid under pressure for said injectors, and valves for selectively controlling the admission of said fluid to said injectors.

3. A system for introducing a finely divided soot destroying chemical into a furnace comprising, a central distributing apparatus having a feed funnel for gravitationally directing the material from a bulk supply to the bottom of the funnel, means for directing a plurality of air drying jets upwardly from the bottom of said funnel and through said material, an air ejector tube projecting upwardly through the bottom of said funnel, controllable means for supplying compressed air to said ejector tube, a feed sleeve positioned in spaced relationship about said ejector tube and having a plurality of slit-like openings formed in its wall and adjacent to the bottom of said funnel, said feed sleeve projecting substantially above said ejector tube, a domed distributor positioned in said funnel and over said feed sleeve whereby material to be distributed is ejected from said feed sleeve against the top of said distributor, said distributor having a plurality of ports opening through its side walls adjacent to its upper end, a plurality of distributor tubes extending from said ports to selected positions adjacent to said furnace, a fluid pressure injector associated with each of said distributor tubes to create a vacuum therein and to discharge into said furnace, a source of fluid under pressure for said injectors, and valves for selectively controlling the admission of said fluid to said injectors.

4. A system for introducing a finely divided chemical into a furnace comprising, a central distributing apparatus having a feed funnel for gravitationally directing the material from a bulk supply to the bottom of the funnel, an air ejector tube projecting upwardly through the bottom of said funnel, controllable means for supplying compressed air to said ejector tube, a feed sleeve positioned in spaced relationship about said ejector tube and having a plurality of openings formed in its wall and adjacent to the bottom of said funnel, said feed sleeve projecting substantially above said ejector tube, a domed distributor positioned in said funnel and over said feed sleeve whereby material to be distributed is ejected from said feed sleeve against the top of said distributor, said distributor having a port opening through its side wall adjacent to its upper end, a distributor tube extending from said port to adjacent to said furnace, a fluid pressure injector associated with said distributor tube to create a vacuum therein and to discharge into said furnace, a source of fluid under pressure for said injector, and a valve for selectively controlling the admission of said fluid to said injector.

5. A system for introducing a finely divided chemical into various positions in a plurality of enclosures comprising, a central distributing apparatus having a feed member for receiving the material from a bulk supply, means for directing a plurality of air drying jets upwardly from the bottom of said member and through said material, an air ejector tube projecting upwardly through the material in said member, controllable means for supplying compressed air to said ejector tube, a feed sleeve positioned in spaced relationship about said ejector tube and having a plurality of openings formed in its walls and adjacent to the bottom of said member, an adjustable valve member for varying the effective size of said openings, said feed sleeve projecting substantially above said ejector tube, a domed distributor positioned over said feed sleeve whereby material to be distributed is ejected from said sleeve against the top of said distributor, said distributor having a plurality of ports opening through its side walls adjacent to its upper end, a plurality of distributor tubes extending from said ports to selected positions adjacent to said enclosures, a fluid pressure injector associated with each of said distributor tubes to create a vacuum therein and to discharge into said enclosures, a source of fluid under pressure for said injectors, and valves for selectively controlling the admission of said fluid to said injectors.

6. A system for introducing a finely divided chemical into various postions in an enclosure comprising, a central distributing apparatus having a feed member for receiving the material from a bulk supply, an air ejector tube projecting upwardly through the material in said member, means for supplying compressed air to said ejector tube, a feed sleeve positioned in spaced relationship about said ejector tube and having an opening formed in its walls and adjacent to the bottom of said member, said feed sleeve projecting substantially above said ejector tube, a domed distributor positioned over said feed sleeve whereby material to be distributed is ejected from said sleeve against the top of said distributor, said distributor having a plurality of ports opening through its side walls adjacent to its upper end, a plurality of distributor tubes extending from said ports to selected positions adjacent to said enclosure, a fluid pressure injector associated with each of said distributor tubes to create a vacuum therein and to discharge into said enclosure, a source of fluid under pressure for said injectors, and valves for selectively controlling the admission of said fluid to said injectors.

7. A system for introducing a finely divided material into an enclosure comprising, distributing apparatus having a tubular feed member, means for maintaining a supply of the material around the lower end of said feed member, said feed member having a feed port formed therein, an adjustable gate element for varying the effective size of said feed port, an ejector tube projecting into said feed member and past said port and terminating short of the end of said feed member, controllable means for supplying compressed air to said ejector tube, a chambered distributor positioned over the end of said feed member whereby material to be distributed is discharged against the wall of said distributor, said distributor having a plurality of distributor ports opening therethrough adjacent its upper end, a plurality of distributor tubes extending from said last mentioned ports to selected positions adjacent said enclosure, a fluid pressure injector associated with each of said distributor tubes to create a vacuum therein and to discharge into said enclosure, a source of fluid under pressure for said injectors, and valves for selectively controlling the admission of said fluid to said injectors.

8. A system for introducing a finely divided material into an enclosure comprising, a distributing apparatus having a tubular feed member, means for maintaining a supply of the material around the lower end of said feed member, said feed member having an inlet port for the material, an ejector tube projecting into said feed member, controllable means for supplying compressed air to said ejector tube, a chambered distributor positioned over the material ejected from said feed member under the influence of air passing from said ejector tube, said distributor having a delivery port opening adjacent its upper end, a distributor conduit extending from said distributor to a selected position adjacent said enclosure, a fluid pressure injector associated with said distributor conduit to create a vacuum therein and to discharge into said enclosure, a source of fluid under pressure for said injector, and a valve for selectively controlling the admission of said fluid to said injector.

9. A distributing apparatus for finely divided material comprising, a manifold body member having a conical recess in its upper face and forming an air manifold chamber adjacent to said conical recess, means for supplying compressed air to said manifold chamber, said body member further forming a cylindrical chamber in its under face communicating through a hole with said conical recess, a funnel member having its lower end sealingly received in said conical recess and terminating above the bottom thereof, said conical recess having its surface cut away in two arcuate grooves whereby said body member and said funnel form two arcuate chambers, jet ports formed through said funnel and opening to said arcuate chambers, valved passages formed in said body member between said manifold chamber and said arcuate chambers, ports opening between said cylindrical chamber and the bottom of said conical recess below said funnel, a valved passage connecting said cylindrical chamber with said manifold chamber, a base plate closing said manifold chamber and said cylindrical chamber and forming a lower valved passage communicating with said manifold chamber, an air ejector tube extending from said lower passage upwardly through said hole into said funnel, a feed sleeve positioned around said ejector tube and forming a plurality of feed slots adjacent to the bottom of said funnel, said sleeve passing in sealing relationship from said base plate and through said hole in said body member and projecting beyond the end of said ejector tube, a sleeve valve adjustable on said feed sleeve to vary the effective length of said slots, a conical dome member having its lower end supported within said funnel and in spaced relationship with the sides of the funnel and around the top of said feed sleeve, the top wall of said dome member having a depending central projection and forming a plurality of laterally opening distribution ports, an air vent opening through the side wall of said dome above the top of said feed sleeve tube, a generally cylindrical chute member having its lower end supported on the top of said funnel to discharge thereinto, and a tunnel-like baffle member extending between the sides of said chute and overlying said dome member.

10. A distributing apparatus for finely divided material comprising, a manifold body member having a conical recess in its upper face and forming an air manifold chamber adjacent to said conical recess, means for supplying compressed air to said manifold chamber, said body member further forming a cylindrical chamber in its under face communicating through a hole with said conical recess, a funnel member having its lower end sealingly received in said conical recess and terminating above the bottom thereof, said conical recess having its surface cut away in a plurality of arcuate grooves whereby said body member and said funnel form a plurality of arcuate chambers, jet ports formed through said funnel and opening to said arcuate chambers, valved passages formed in said body member between said manifold chamber and said arcuate chambers, ports opening between said cylindrical chamber and the bottom of said conical recess below said funnel, a valved passage connecting said cylindrical chamber with said manifold chamber, a base plate closing said manifold chamber and said cylindrical chamber and forming a lower valved passage communicating with said manifold chamber, an air ejector tube extending from said lower passage upwardly through said hole into said funnel, a feed sleeve positioned around said ejector tube and forming a plurality of feed slots adjacent to the bottom of said funnel, said sleeve passing in sealing relationship from said base plate and through said hole in said body member and projecting beyond the end of said ejector tube, a sleeve valve adjustable on said feed sleeve to vary the effective length of said slots, a conical dome member having its lower end supported within said funnel in spaced relationship with the sides of the funnel and around the top of said feed sleeve, the top wall of said dome member having a depending central projection and forming a plurality of laterally opening distribution ports, a generally cylindrical chute member having its lower end supported on the top of said funnel to discharge thereinto, and a tunnel-like baffle member extending between the side of said chute and overlying said dome member.

11. A distributing apparatus for finely divided material comprising, a manifold body member having a conical recess in its upper face and forming an air manifold chamber adjacent to said conical recess, means for supplying compressed air to said manifold chamber, said body member further forming a lower cylindrical chamber in its under face joined through a hole with said conical recess, a funnel member having its lower end sealingly received in said conical recess and terminating above the bottom thereof, the walls of said conical recess being cut away whereby said body member and funnel form an annular chamber, said funnel forming jet ports opening to said annular chamber, ports opening between said cylindrical chamber and the bottom of said conical recess below said funnel, a valved passage connecting said lower cylindrical chamber with said manifold chamber, a second valved passage opening between said annular chamber and said manifold chamber, a base plate closing said manifold and lower chamber and forming a third valved passage communicating with said manifold chamber, an air ejector tube extending from said third passage upwardly through said hole into said funnel, a feed sleeve positioned around said ejector tube and forming a plurality of feed openings adjacent to the bottom of said funnel, said sleeve passing in sealing relationship from said base plate through said lower chamber and said hole to substantially beyond the end of said ejector tube, a valve adjustable on said sleeve to vary the effective size of said feed openings, a conical dome member having its lower end supported within said funnel in spaced relationship with the sides of the funnel and over the top of said feed sleeve, the top wall of said dome member having a depending central projection and forming a plurality of laterally opening distribution ports, a generally cylindrical chute member having its lower end registering with the top of said funnel to discharge thereinto, and a tunnel-like baffle member extending between the sides of said chute and overlying said dome member.

12. A distributing apparatus for finely divided material comprising, a manifold body member having a conical recess in its upper face and forming an air manifold chamber adjacent to said conical recess, means for supplying compressed air to said manifold chamber, said body member further forming a lower chamber in its under face joined through a hole with said conical recess, a funnel member having its lower end sealingly received in said conical recess and terminating above the bottom thereof, the walls of said conical recess being cut away whereby said body member and funnel form an annular chamber, said funnel forming jet ports opening to said annular chamber, ports opening between said lower chamber and the bottom of said conical recess below said funnel, a valved passage connecting said lower chamber with said manifold chamber, a second valved passage opening between said annular chamber and said manifold chamber, a base plate closing said manifold and lower chamber and forming a third valved passage communicating with said manifold chamber, an air ejector tube extending from said third passage upwardly through said hole into said funnel, a feed sleeve positioned around said ejector tube and forming a plurality of feed openings adjacent to the bottom of said funnel, said sleeve passing in sealing relationship from said base plate through said lower chamber and said hole to substantially beyond the end of said ejector tube, a dome member having its lower end supported within said funnel in spaced relationship with the sides of the funnel and over the top of said feed sleeve, the top wall of said dome member forming a plurality of laterally opening distribution ports, a generally cylindrical chute member having its lower end registering with the top of said funnel to discharge thereinto, and a tunnel-like baffle member extending between the sides of said chute and overlying said dome member.

13. A distributing apparatus for finely divided material comprising, a manifold body member having a recess in its upper face and forming an air manifold chamber adjacent to said recess, means for supplying compressed air to said manifold chamber, said body member further forming a lower chamber in its under face joined through a hole with said recess, a funnel member having its lower end sealingly received in said recess and terminating above the bottom thereof, ports opening between said lower chamber and the bottom of said recess below said funnel, a valved passage connecting said lower chamber with said manifold chamber, a base plate closing said manifold chamber and lower chamber and forming a second valved passage communicating with said manifold chamber, an air ejector tube extending from said second passage upwardly into said funnel, a feed sleeve positioned around said ejector tube and forming a feed opening adjacent to the bottom of said funnel, a valve adjustable on said feed sleeve to vary the effective size of said opening, a dome member having its lower end supported within said funnel in spaced relationship with the sides of the funnel and over the top of said feed sleeve, the top wall of said dome member forming a plurality of laterally opening distribution ports, and suction tubes connected to said ports to draw off material in air suspension in said dome.

14. A distributing apparatus for finely divided material comprising, a manifold body member having a recess in its upper face and forming an air manifold chamber adjacent to said recess, means for supplying compressed air to said manifold chamber, said body member further forming a lower chamber in its under face joined through a hole with said recess, a funnel member having its lower end sealingly received in said recess, ports opening between said lower chamber and the bottom of said funnel, a valved passage connecting said lower chamber with said manifold chamber, a base plate closing said lower chamber and forming a second valved passage communicating with said manifold chamber, an air ejector tube extending from said second passage upwardly into said funnel, a feed sleeve positioned around said ejector tube and forming a feed opening adjacent to the bottom of said funnel, a dome member having its lower end supported within said funnel in spaced relationship with the sides of the funnel and over the top of said feed sleeve, the top wall of said dome member forming a plurality of laterally opening distribution ports, and suction tubes connected to said ports to draw off material in air suspension in said dome.

15. Distributing apparatus for finely divided material, comprising, a tubular feed member provided with an inlet port, means for maintaining a supply of the material to said inlet port, an adjustable gate element for controlling said inlet port, an ejector tube projecting into said feed member and beyond said inlet port and terminating short of the other end of said feed member, controllable means for supplying compressed air to said ejector tube, a chambered distributor positioned over the end of said feed member whereby material to be distributed is ejected from said feed member against the top of said distributor under the influence of air passing from said ejector tube, said distributor having a plurality of distributor tubes opening to the upper end thereof, means adjacent to said feed member forming a series of drying air ports directed across said inlet port, a source of air under pressure for said drying air ports, and a valve for selectively controlling the admission of said air to said drying air ports.

16. Distributing apparatus for finely divided material comprising, a tubular feed member, means for maintaining a supply of the material around one end of said feed member, said feed member having a material inlet port, an ejector tube projecting into said feed member beyond said inlet port and terminating short of the other end of said feed member, means for supplying compressed air to said ejector tube, a chambered distributor positioned to receive the material ejected from said feed member and having a baffle portion, a plurality of distributor conduits opening to the chamber of said distributor, means adjacent to said feed member forming a series of drying air ports directed across said inlet port, a source of air under pressure for said drying air ports, and a valve for selectively controlling the admission of said air to said drying air ports.

17. Distributing apparatus for finely divided material comprising, a vertical tubular feed member, gravity means for maintaining a supply of the material around one end of said feed member, said feed member having a feed port at said one end, an ejector tube projecting into said feed member in spaced relationship therewith and past said port and terminating short of the other end of said feed member, controllable means for supplying compressed air to said ejector tube, a chambered distributor positioned to receive the discharge from said feed member under the influence of air discharged from said ejector tube, said distributor having a discharge opening, means forming a vent from the interior to the exterior of said distributor, and a delivery conduit for said distributor connected to said discharge opening.

18. Distributing apparatus for finely divided material comprising, a tubular feed member, means for maintaining a supply of the material around one end of said feed member, said feed member having a feed port formed in said one end, an ejector tube projecting into said member in spaced relationship therewith and past said port and terminating short of the other end of said feed member, means for supplying compressed air to said ejector tube, a chambered distributor positioned to receive the discharge of said feed member and so that the material to be distributed is ejected from said feed member against a wall portion of said distributor under the influence of air passing from said ejector tube, the chamber of said distributor being open to atmospheric pressure whereby air supplied by said ejector tube will not build up pressure in said distributor, and a delivery conduit for said distributor.

GEORGE F. WALTERS.

REFERENCES CITED

The following references are of record in the file of this patent:

UNITED STATES PATENTS

| Number | Name | Date |
|---|---|---|
| 554,300 | Parker | Feb. 11, 1896 |
| 914,105 | Boland | Mar. 2, 1909 |
| 1,205,918 | Miller et al. | Nov. 21, 1916 |
| 2,123,537 | Marr | July 12, 1938 |